March 30, 1954  E. F. STEINERT ET AL  2,673,915
TWIN ARC WELDING SYSTEM
Filed April 14, 1950
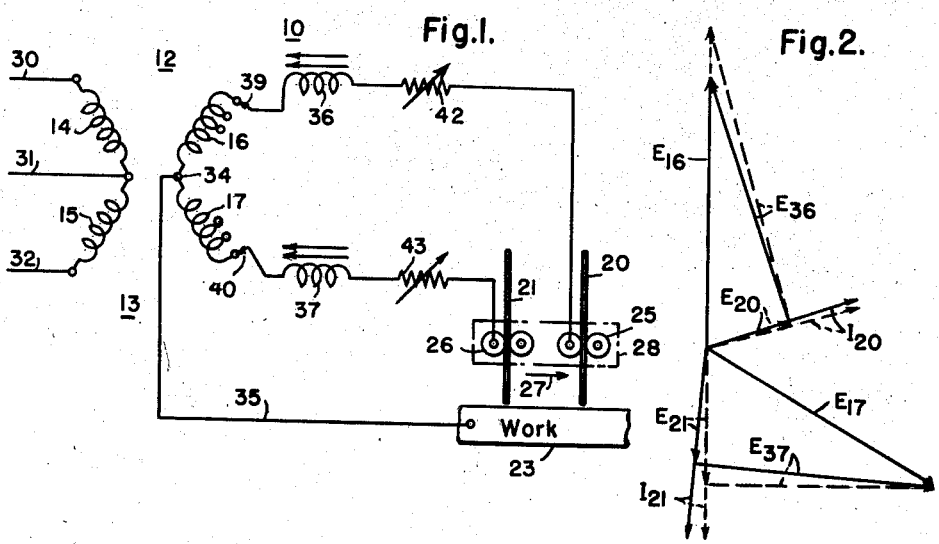
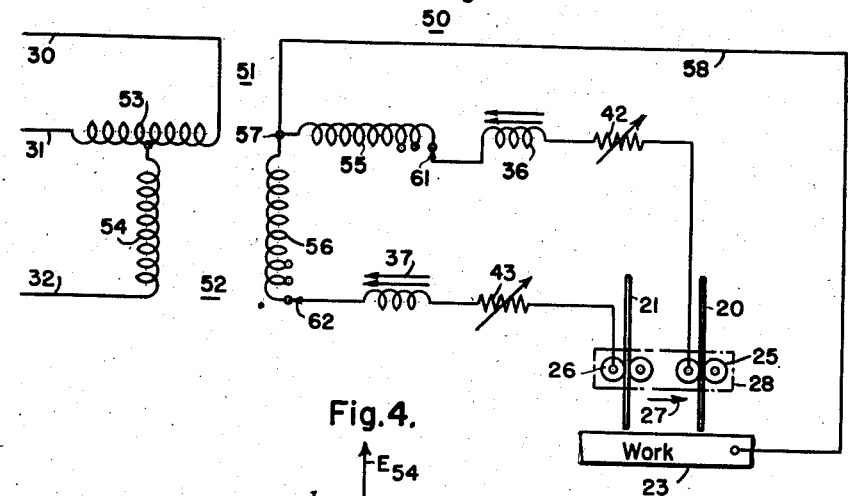
WITNESSES:
INVENTORS
Emil F. Steinert, Harry J. Bichsel
and Martin Rebuffoni.
BY
ATTORNEY

Patented Mar. 30, 1954

2,673,915

UNITED STATES PATENT OFFICE 2,673,915

TWIN ARC WELDING SYSTEM

Emil F. Steinert, Williamsville, Harry J. Bichsel, East Aurora, and Martin Rebuffoni, Williamsville, N. Y., assignors to Westinghouse Electric Corporation, East Pittsburgh, Pa., a corporation of Pennsylvania Application April 14, 1950, Serial No. 155,828

11 Claims. (Cl. 219—8)

Our invention relates, generally, to arc welding, and it has reference in particular to twin arc welding systems.

Generally stated, it is an object of our invention to provide a twin arc welding system which is simple and inexpensive to manufacture and is reliable and effective in operation.

More specifically, it is an object of our invention to provide, in a multiple arc welding system, for maintaining a pair of arcs in leading and trailing relation with a predetermined phase relation between the currents of the leading and trailing arcs, which are maintained in a common pool of weld metal as they progress along a weld.

Another object of our invention is to provide, in a dual arc welding system, for utilizing a pair of single-phase transformers in an open delta circuit for supplying current to a pair of arcs disposed to move along a workpiece in a predetermined spaced relation.

Yet another object of our invention is to provide, in a twin arc welding system, for supplying current to leading and trailing arcs, which are maintained between spaced apart electrodes in a common pool of weld metal as they move along the work which is to be welded, in substantially quadrature phase relation so as to reduce interference between the arcs to a minimum.

It is a further object of our invention to provide in a twin arc welding sytsem, for using a three-phase to two-phase Scott connection of a pair of single-phase transformers for supplying current to a pair of leading and trailing arcs as they move along work upon which a welding operation is to be performed.

It is an important object of our invention to provide, in a twin arc welding system, for securing a substantially balanced three-phase load wtih a minimum of apparatus.

Other objects will, in part, be obvious and will, in part, be explained hereinafter.

According to one embodiment of our invention, welding current is supplied to leading and trailing arcs in a twin or dual arc welding system from a pair of a single-phase welding transformers. These transformers are connected in a Scott connection with their primary windings connected to a three-phase source, and the secondary windings connected to supply two-phase electrical energy to the pair of welding arcs. The secondary windings are connected in a three conductor arrangement with a common conductor connected to the work upon which the welding operation is to be performed. Variable reactance devices and resistance devices are connected between the other terminals of the transformers and the welding electrodes so as to provide for adjusting both the values of the welding currents and the phase relations between them.

For a more complete understanding of the nature and scope of our invention, reference may be made to the following detailed description which may be read in connection with the accompanying drawing, in which:

Figure 1 is a diagrammatic view of a twin arc welding system embodying the invention in one of its forms, Fig. 2 is a vector diagram showing the relationship between the currents and voltages of the system of Fig. 1, Fig. 3 is a diagrammatic view of an arc welding system embodying the invention in another of its forms, and Fig. 4 is a vector diagram showing the relationship between the several voltages and currents of the arc welding system of Fig. 3.

Referring to Fig. 1, the reference numeral 10 may denote, generally, a twin or dual arc welding system wherein a pair of single-phase welding transformers 12 and 13 having primary windings 14 and 15 and secondary windings 16 and 17, respectively, may be utilized to supply welding current to electrodes 20 and 21 which may be disposed on the order of 1½ inches apart, for example, in leading and trailing relation, respectively, for maintaining arcs in a common pool of weld metal as they jointly traverse work 23 upon which a welding operaiton is to be performed.

The electrodes 20 and 21 may be of any suitable character comprising, for example, lengths of wire electrode which may be fed toward the work 23 by means of feed rolls 25 and 26, respectively. The electrodes 20 and 21 are disposed to be maintained in predetermined spaced relationship along the line of the weld so as to maintain separate arcs with the work 23 in a common pool of molten metal as they move along the work in the direction indicated by the arrow 27.

The electrodes 20 and 21 may be maintained in arcing relationship with the work 23 in any suitable manner, the feed rolls 25 and 26 being, for example, supported by a common movable support means represented generally by the dot-dash outline 28 which may, for example, comprise a common support for a pair of automatic welding heads of any one of a number of types which are well known in the art, and which may be operatively connected to the feed rolls 25 and 26 independently of each other for maintaining electrodes 20 and 21 in arcing relationship with the work 23 in accordance with their respective arc voltages.

The primary windings 14 and 15 of the transformers 12 and 13 may be connected in open delta to a three-phase source represented by the conductors 30, 31 and 32. The secondary windings 16 and 17 may also be connected in an open delta or V arrangement having a common junction 34 which may be connected to the work 23 by means of a conductor 35. The other ends of the secondary windings 16 and 17 may be connected to the welding electrodes 20 and 21 by means of variable reactance devices 36 and 37, which may be used to vary the values of the arc currents, and may be connected to the windings 16 and 17 by means of adjustable taps 39 and 40. Adjustable resistance devices 42 and 43 may be connected in circuit relationship with the welding electrodes and the secondary windings for shifting the phase relations of the secondary voltages in conjunction with the adjustable tap devices.

Referring to Fig. 2, the solid lines show the phase relationships with the secondary voltages $E_{16}$ and $E_{17}$ of the secondary windings 16 and 17 having values of substantially 85 volts open circuit and the resistance devices 42 and 43 reduced to substantially zero effective values. Under these conditions, the voltages $E_{36}$ and $E_{37}$ of the reactance devices will be substantially as shown, and the arc voltage $E_{20}$ of the leading arc is substantially 28 volts while the arc voltage $E_{21}$ of the trailing arc is approximately 37 volts. With the primary windings 14 and 15 connected in a nominal 120° phase displacement, the arc voltages show a phase displacement of approximately 113.5°, the current $I_{21}$ and the voltage $E_{21}$ of the trailing arc lagging the current $I_{20}$ and the voltage $E_{20}$ of the leading arc.

With the adjustable taps 39 and 40 so adjusted as to make $E_{16}$ equal to 100 volts, and $E_{17}$ equal to 85 volts open circuit, the dotted lines show a phase displacement of approximately 106.5° with the resistance device 42 having a substantially zero value and the resistance device 43 being adjusted to produce approximately a 5 volt drop. Under these conditions, the arc voltage $E_{20}$ is approximately 28 volts while the arc voltage $E_{21}$ will be approximately 42 volts.

By connecting the transformers so that $E_{16}$ lags $E_{17}$ by 120°, instead of leading it by 120°, the welding currents of the two arcs may be given a phase relationship between 120 to 133½° without exceeding an open circuit voltage of 100, and without producing a greater drop across the resistance devices than approximately 5 volts, in order to minimize losses.

With transformers connected as hereinbefore described, the time phase displacement between the arc currents will be sufficient to practically eliminate the disadvantages of magnetic interaction between the arcs. By changing the phase relationships between the transformer windings, a wide range of angular relations between the welding currents of the arcs may be attained. An arc welding system embodying the features of our invention provides a more or less balanced three-phase load on the source and is sufficiently flexible to provide the necessary variation in depth of penetration, shape of weld bead, etc., which may be required over a wide range of different welding conditions.

Referring to Fig. 3, the reference numeral 50 may denote, generally, a twin or dual arc welding system wherein a pair of welding transformers 51 and 52 having primary windings 53 and 54, and secondary windings 55 and 56, respectively, may be connected to supply welding current to a pair of electrodes 20 and 21 which may be disposed to maintain separate arcs in leading and trailing relationship in a common pool of weld metal as the arcs move relative to work 23 upon which a welding operation is to be performed.

The electrodes 20 and 21 may, as hereinbefore described in connection with the system of Fig. 1, be maintained in arcing relationship with the work 23 by means of feed rolls 25 and 26 actuated by suitable driving means and mounted on a common support represented generally by the dot-dash outline 28, which may be disposed to move relative to the work 23 in the direction of the arrow 27.

The transformers 51 and 52 may be disposed in a Scott three-phase to two-phase connection with the primary windings 53 and 54 T-connected to the conductors 30, 31 and 32 of a three-phase source. The secondary windings 55 and 56 may be connected in a three-wire two-phase connection having a common junction 57 which may be connected to the work by means of a conductor 58. The opposite ends of the secondary windings may be connected by means of adjustable taps 61 and 62 to the leading and trailing welding electrodes 20 and 21 through adjustable reactance devices 36 and 37, and adjustable resistance devices 42 and 43, respectively.

Referring to Fig. 4, it will be seen that the secondary voltages $E_{55}$ and $E_{56}$ are in a substantially 90° relationship, with the arc voltages $E_{20}$ and $E_{21}$ in a similar phase relationship in the opposite direction to the currents of the primary windings 53 and 54. The primary currents $I_{30}$, $I_{31}$ and $I_{32}$ represent the line currents supplied to the primary windings of the transformers. $E_{53}$ and $E_{54}$ designate the primary voltages, while $I_{53}$ and $I_{54}$ designate the primary currents. The arc currents are $I_{55}$ and $I_{56}$. The value of $I_{31}$ may be calculated by using a vector $-1/2 I_{54}$, and completing the triangle with $-I_{53}$.

With the transformers connected in a Scott connection, a substantially 90 electrical degree relationship may be obtained between the arc currents of the two arcs of the twin arc welding system, thereby reducing the magnetic interference between the arc currents to a minimum value. This arrangement provides a balanced three-phase load, which is highly desirable, particularly when welding plates have a thickness of one-quarter inch or more, since relatively high values of welding current are used.

An arc welding system embodying the features of our invention provides a balanced load with a minimum of apparatus, since not only is one welding transformer eliminated, but the reactor which would otherwise be used in the work lead of a system where a closed delta supply system is used, is also eliminated.

From the above description and the accompanying drawing, it will be apparent that we have provided, in a simple and effective manner, for supplying electrical energy to the two arcs of a twin arc welding system. By utilizing either an open delta or a Scott connection of welding transformers, only two transformers are required to supply current to the two welding arcs. By utilizing tapped transformer connections and adjustable impedance devices in the electrode leads, such systems may be made sufficiently flexible to accommodate a wide range of welding conditions. Stable arcs may be easily maintained in welding systems embodying the features of our invention and a relatively wide range of relationships of arc currents may be obtained so as to produce widely differing weld characteristics as may be desired under differing weld conditions.

Since certain changes may be made in the above described construction, and different embodiments of the invention may be made without departing from the spirit and scope thereof, it is intended that all the matter contained in the above description and shown in the accompanying drawing shall be considered as illustrative and not in a limiting sense.

We claim as our invention:

1. The combination in a twin arc welding system, of a pair of electrodes disposed to be maintained in arcing relationship with a workpiece and moved along said workpiece in a predetermined sequential relationship in the direction of the welded seam, a pair of transformers having primary windings disposed to be supplied from two different pairs of the phase conductors of a three-phase source of alternating-current and secondary windings each having a pair of terminals, one of said terminals of each secondary being disposed to be connected to the workpiece and the other terminals being disposed to be connected each to a different one of said electrodes.

2. In a double arc welding sytem the combination with a pair of electrodes disposed in spaced relation along the path of a weld to be made on a workpiece and arranged to be fed independently toward the workpiece, of a pair of transformers having primary windings disposed to be connected in current conducting relation with the three conductors of a three-phase source and secondary windings connected in circuit relation with the workpiece and a different one of the electrodes.

3. A dual arc welding system comprising, a pair of electrode members disposed in leading and trailing relation along the welded seam to traverse a workpiece and maintain arcs in a common molten pool in the workpiece, a pair of transformers connected in a Scott connection having primary windings connected in a T-relation to a three-phase source and secondary windings arranged with a common junction connected to the workpiece and terminal junctions connected to different ones of the electrodes.

4. A multiple arc welding system comprising, a pair of electrode members so disposed in spaced relation longitudinally of a weld as to maintain leading and trailing arcs along the welded seam independently in a common pool of molten weld metal in a workpiece, and a pair of transformers having primary windings disposed to be connected in an open delta connection to a three-phase source and secondary windings connected between the workpiece and the electrodes to maintain voltages between the workpiece and each electrode which are approximately 120 electrical degrees apart.

5. In a twin arc welding system, the combination with a pair of electrodes disposed to individually maintain arcs in longitudinally spaced relation of each other along the welded seam in a common pool of molten weld metal in work to be welded, a pair of transformers having primary windings connected in current conducting relation with a three-phase source and secondary windings connected to have a common junction and one terminal each remote from said junction, circuit means connecting the common junction to the work, and additional circuit means including a variable impedance device connecting the remote terminal of each secondary winding to a different electrode.

6. An arc welding system comprising, a pair of electrode members independently disposed to maintain arcs with a workpiece in longitudinal spaced relation along a weld seam, a pair of transformers having primary windings disposed to be connected in open delta relation with a three-phase source and having secondary windings connected in open delta with a common junction and a plurality of tapped connections adjacent the end of each secondary winding remote from the common junction, circuit means connecting the common junction to the workpiece, and circuit means including variable impedance means so connecting the electrodes to the tapped connections of the secondary windings that the voltage of the leading electrode leads that of the trailing electrode.

7. In an arc welding system, a pair of electrodes disposed to be independently maintained in arcing relation with work upon which a welding operation is to be performed, one of said electrodes being disposed a predetermined distance in advance of the other such that said other electrode maintains an arc in the same pool of weld metal as does said one electrode, a pair of transformers having primary windings connected in open delta for connection to a three-phase source of alternating-current and secondary windings connected in open delta between the work and said electrodes, and adjustable resistance means connected in circuit relation with said secondary windings to vary the phase angle between the voltages applied to the electrodes.

8. An arc welding system for welding a workpiece by producing a longitudinal weld along it comprising terminals for deriving electrical energy, a pair of welding electrodes, means for moving said electrodes along said weld so that one electrode leads the other in the direction of said weld and connections between said terminals and said electrodes for supplying simultaneous welding arc currents displaced in phase between said electrodes and said workpiece, said connections including impedance means for setting said arc currents at magnitudes and in a phase relationship such that magnetic interaction between said currents is suppressed.

9. An arc welding system for welding a workpiece by producing a longitudinal weld along it comprising terminals for deriving electrical energy, a pair of welding electrodes, means for moving said electrodes along said weld so that one electrode leads the other in the direction of said weld, means for adjusting the position of each of said electrodes relative to said work independently of the other, and connections between said terminals and said electrodes for supplying simultaneously welding arc currents displaced in phase between said electrodes and said workpiece, said connections including impedance means for setting said arc currents at magnitudes and in a phase relationship such that magnetic interaction between said currents is suppressed.

10. An arc welding system for welding a workpiece by producing a longitudinal weld along it comprising terminals for deriving electrical energy, a pair of welding electrodes, means for moving said electrodes along said weld so that one electrode leads the other in the direction of said weld and connections between said terminals and said electrodes for supplying simultaneously welding arc currents displaced in phase between said electrodes and said workpiece, said connections being adapted to supply power at open circuit potentials of between approximately 85 and 100 volts and including impedance means for setting the phase relationship between said arc currents at between approximately 106.5° and 133.5°.

11. An arc welding system for welding a workpiece by producing a longitudinal weld along it comprising terminals for deriving electrical energy, a pair of welding electrodes, means for moving said electrodes along said weld so that one electrode leads the other in the direction of said weld and connections between said terminals and said electrodes for supplying simultaneously welding arc currents displaced in phase between said electrodes and said workpiece, said connections including impedance means cooperating to set the phase relationship between said arc currents at approximately 90°.

EMIL F. STEINERT.
HARRY J. BICHSEL.
MARTIN REBUFFONI.

References Cited in the file of this patent

UNITED STATES PATENTS

| Number | Name | Date |
|---|---|---|
| 1,340,056 | Kenyon | May 11, 1920 |
| 1,371,094 | Holslag | Mar. 8, 1921 |
| 1,610,920 | Bethenod | Dec. 14, 1926 |
| 2,320,824 | Landis | June 1, 1943 |
| 2,489,002 | Babbitt | Nov. 22, 1949 |

FOREIGN PATENTS

| Number | Country | Date |
|---|---|---|
| 584,355 | Great Britain | Jan. 13, 1947 |